INVENTOR.
GEORGE O. GRAVES
BY M. A. Hobbs
ATTORNEY

INVENTOR.
GEORGE O. GRAVES
BY *M. A. Hobbs*

ATTORNEY

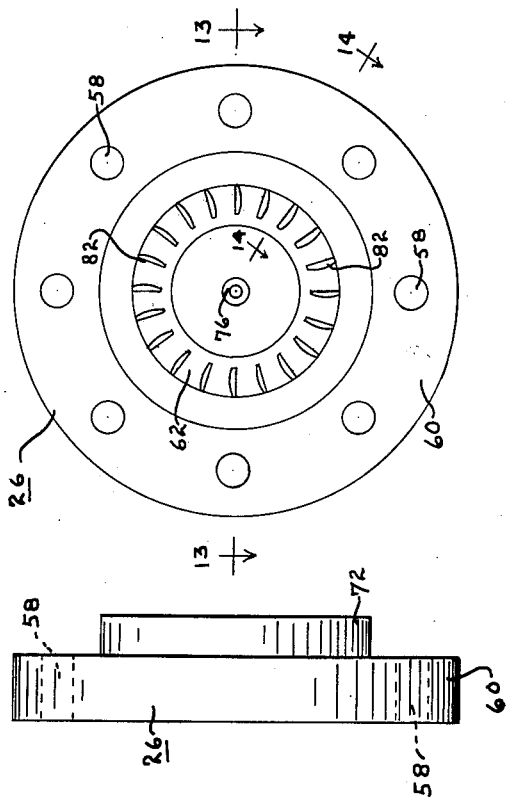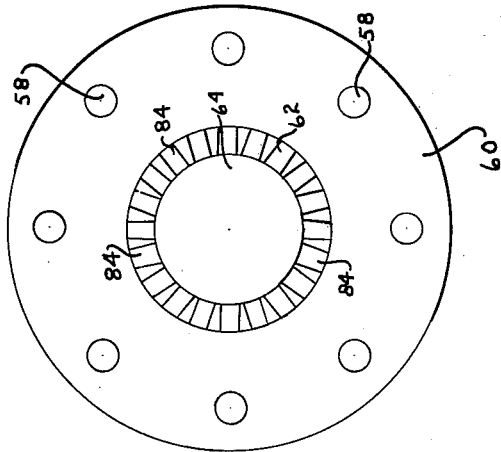

June 5, 1962    G. O. GRAVES    3,037,442
FOOD PROCESSING MACHINE
Filed March 26, 1958    5 Sheets-Sheet 4
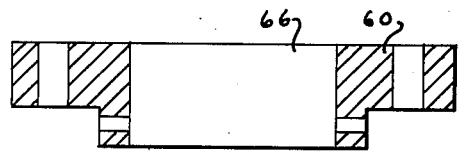
FIG. 12
FIG. 7
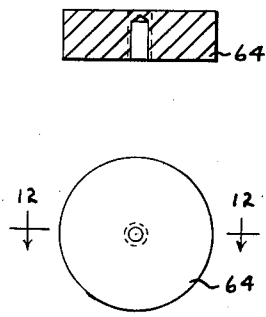
FIG. 11
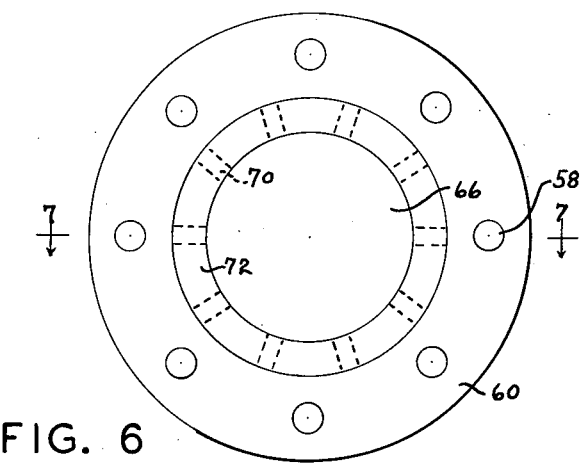
FIG. 6
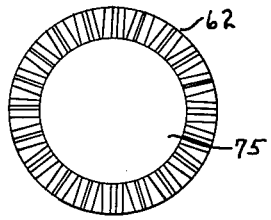
FIG. 10
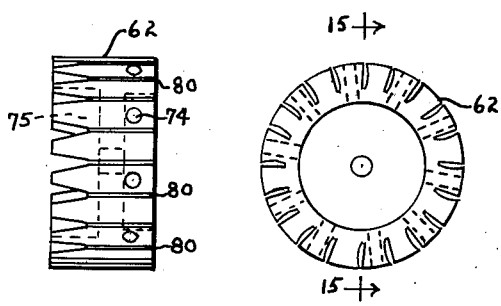
FIG. 9    FIG. 8
INVENTOR.
GEORGE O. GRAVES
BY M. A. Hobbs
ATTORNEY June 5, 1962  G. O. GRAVES  3,037,442
FOOD PROCESSING MACHINE
Filed March 26, 1958  5 Sheets-Sheet 5
FIG. 13
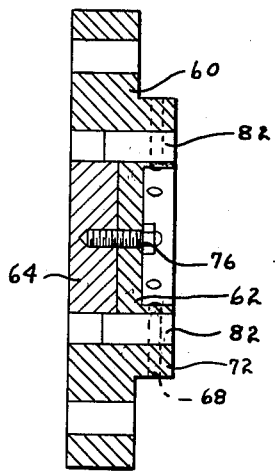
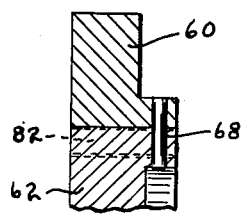
FIG. 14
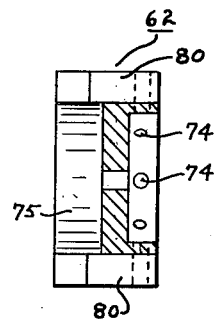
FIG. 15
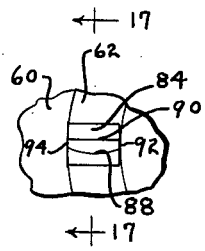
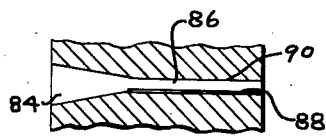
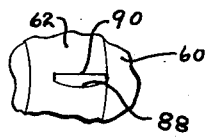
FIG. 16  FIG. 17  FIG. 18
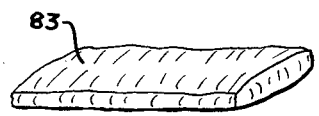
FIG. 19
INVENTOR.
GEORGE O. GRAVES
BY M. A. Hobbs
ATTORNEY United States Patent Office 3,037,442
Patented June 5, 1962

3,037,442
FOOD PROCESSING MACHINE
George O. Graves, Mishawaka, Ind. (% Michiana Mills, 802 S. Carlisle St., South Bend, Ind.)
Filed Mar. 26, 1958, Ser. No. 724,030
9 Claims. (Cl. 99—238)

The present invention relates to a food processing machine and more particularly to a machine for producing cereal products such as corn meal sticks or collets.

In the processing of corn meal to produce collets, the meal is first mixed with water in an amount less than that required to form a paste, and the resultant mixture is ground and extruded at a temperature sufficiently high to vaporize the moisture in the corn meal mix. The material as it emerges from the extrusion die puffs into a highly cellular and relatively brittle material and is cut into sections of the desired length. The material thus produced is further processed by baking, salting and coating with a flavoring material such as a cheese mix and is then packaged ready for shipping. The final product to be satisfactory must be uniform in texture and flavor and should be substantially the same size and shape. Recently efforts have been made to produce a commercial product of the foregoing consistency which is relatively long and flat in shape so that it can easily and conveniently be held in the hand and eaten with the fingers. Difficulty was encountered in obtaining a product with a uniform shape and consistency and bilateral symmetry and with a substantially uniform thickness throughout its length. It is therefore one of the principal objects of the present invention to provide a machine including a special extrusion die for producing collets of the aforesaid type having the desired uniformity in size, shape, density and symmetry.

Another object of the present invention is to provide an extrusion die or head for making a flat elongated product of the foregoing type, said die being constructed of several parts to facilitate fabrication, cleaning and servicing, and which when said parts are assembled, constitutes a single integrated single-stage die structure.

Still another object of the invention is to provide a single-stage, multiple-part die for producing collets, which operates as a single die and which can be disassembled for cleaning and servicing.

A further object is to provide an extrusion die for a machine for performing the aforementioned process, which can readily be fabricated and easily assembled on and removed from said machine and which embodies a simplified mode of operation for making a relatively flat, elongated extruded product from cereal, such as corn meal and the like.

Another object of the invention is to provide an extrusion die having a plurality of extrusion holes for making a flat, elongated processed cereal product having substantial uniformity in size and shape from one hole to another.

Additional objects and advantages will become apparent from the following description and accompanying drawings, wherein:

FIGURE 3 is an enlarged front outside elevational view of the extrusion die, shown removed from the machine;

FIGURE 4 is a side elevational view of the extrusion die;

FIGURE 5 is a rear elevational view of the extrusion die;

FIGURE 6 is a front elevational view of the outside annular part of the die showing it separate from the other parts of the die;

FIGURE 7 is a cross-sectional view of the die part shown in FIGURE 6, taken on line 7—7;

FIGURES 8, 9 and 10 are front, side and rear elevational views, respectively, of the die insert containing a plurality of extrusion holes;

FIGURE 11 is an elevational view of a die insert removed from the die;

FIGURE 12 is a cross-sectional view of the insert shown in FIGURE 11, taken on line 12—12 of said figure;

FIGURE 13 is a cross-sectional view of my extrusion die taken on line 13—13 of FIGURE 3;

FIGURE 14 is a fragmentary cross-sectional view of the die taken on line 14—14 of FIGURE 3;

FIGURE 15 is a cross-sectional view of the die insert shown in FIGURES 8, 9 and 10, taken on line 15—15 of FIGURE 8;

FIGURE 16 is an enlarged fragmentary elevational view of the die showing the inlet to one of the extrusion holes;

FIGURE 17 is an enlarged fragmentary cross-sectional view of the die taken on line 17—17 of FIGURE 16;

FIGURE 18 is an enlarged fragmentary elevational view of the die showing the outlet to the extrusion hole shown in FIGURES 16 and 17; and FIGURE 19 is a perspective view of the product made by the use of the machine, including the die, disclosed herein.

Figure 1:
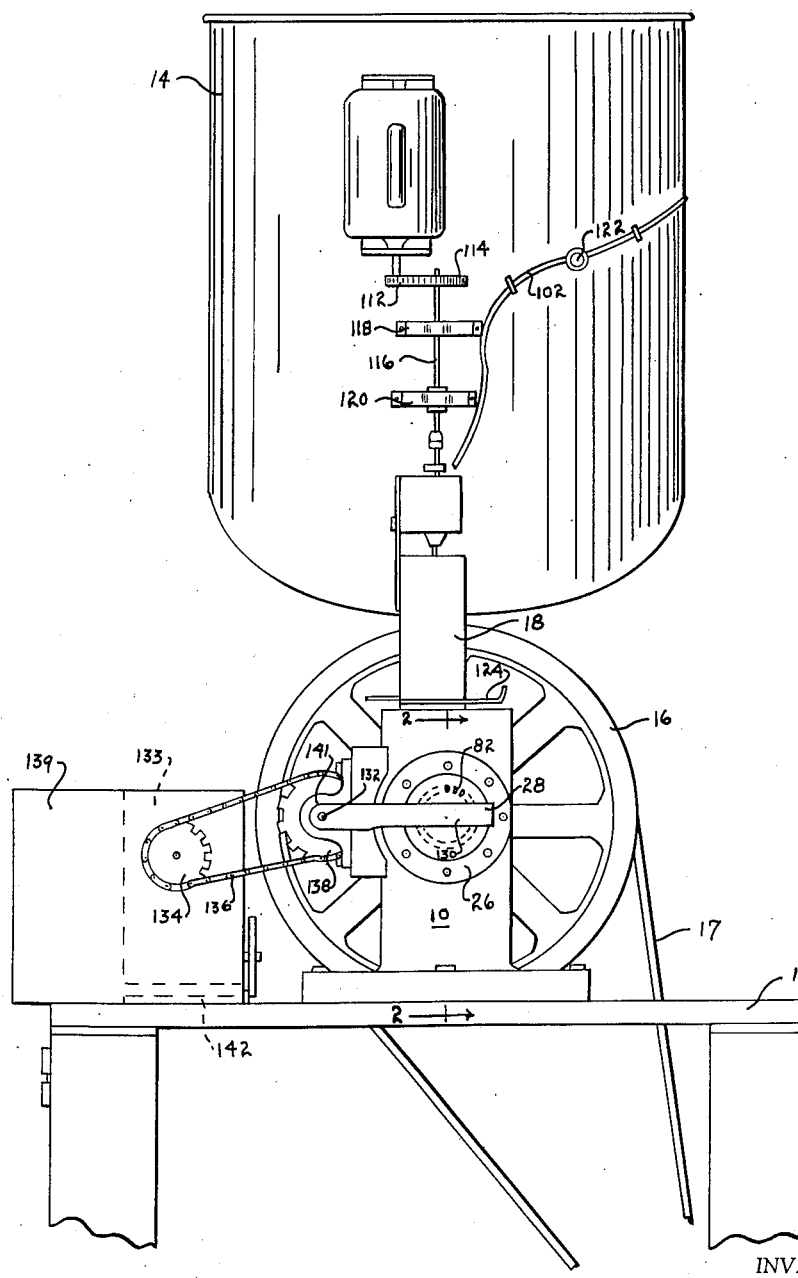
FIGURE 1 is a front elevational view of my machine, showing only a portion of the base on which it is mounted.
Figure 2:
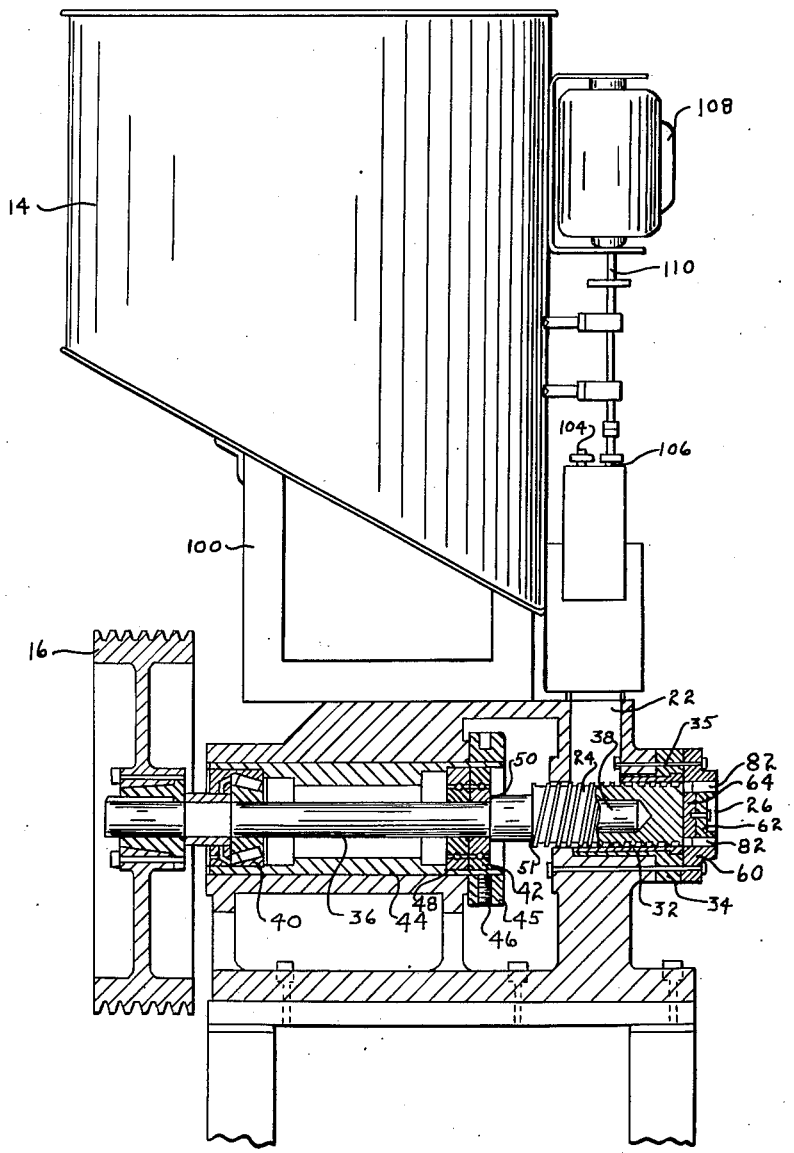
FIGURE 2 is a side elevational view and partial cross-sectional view of the machine, the section being taken on line 2—2 of FIGURE 1.

Referring more specifically to the drawings, a housing 10 which contains the meal extruding mechanism is mounted on a base 12 and supports a hopper 14 for the corn meal ready to be processed by the machine. The meal extruding mechanism is driven through a pulley 16 and a plurality of V-belts 17 by a motor (not shown) mounted in the lower portion of base 12, and is supplied with corn meal from hopper 14 through a chamber 18 in which the meal is mixed with a small amount of moisture, thoroughly stirred and thence discharged into the throat 22 of the extruding mechanism. This mixture is propelled by a screw 24 toward the right, as shown in FIGURE 2, and extruded through the holes in a head plate 26 at a temperature sufficiently high to vaporize the moisture in the mixture and to prebake the material sufficiently to render it relatively brittle. As the material emerges from the holes in the head plate in a relatively flat, elongated form, it is cut into sections of the desired length by a revolving power driven knife 28. The sections fall into a chute and thence into a container placed below the machine.

The extruding mechanism is mounted in the housing and consists of screw 24, an insert 32 in which the screw rotates, and head plate 26 through which the meal is extruded under the pressure created by rotation of the screw propelling the meal toward the plate. Insert 32 which has a helical groove on its internal surface resembling the screw threads on screw 24 is seated in an adapter 34 disposed in a horizontal bore in the housing. The adapter and sleeve are held in place in the bore by a plurality of bolts or screws 35 extending through the holes in the marginal portion of the head plate and in the upright in which those elements are seated, said bolts also securing said plate to the end of the adapter and sleeve. Screw 24 is driven by the motor through pulley 16 and shaft 36 which is connected to said screw by a spline 38 and is journalled in roller bearing 40 and thrust bearing 42 mounted in the ends of sleeve 44 disposed in a horizontal bore in the housing and held in a fixed position by a collar 45 and set screw 46. Thrust bearing 42 is supported against axial movement away from screw 24 by an annular shoulder 48 on the internal surface of sleeve 44 and shaft 36 is supported against similar axial movement by an annular shoulder 50 on said shaft bearing against the thrust bearing. A second annular shoulder 51 on shaft 36 forms an abutment for screw 24 and prevents it from moving away from the head plate under the pressure created by the screw propelling the meal toward and through the plate. Machines of the foregoing general construction and design are disclosed and described in detail in my copending applications Serial No. 553,088, filed December 14, 1955, and Serial No. 572,-849, filed March 21, 1956, now U.S. Patents Nos. 2,853,-027 and 2,842,072, respectively.

The die 26 with which the present invention is principally concerned, is secured to the end of adapter 34 and sleeve 32 by bolts 35 through holes 58 and consists generally of ring 60, extrusion hole insert 62 and filler insert 64, insert 62 being held within opening 66 of the ring by a plurality of pins 68 extending through radial holes 70 in an annular extension 72 of the ring and through matching radial holes 74 in the forward half of the extrusion hole insert 62. Filler insert 64 is mounted in the recess 75 on the inner part, i.e. on the inlet side of the insert 62, to fill the recess and provide a flat surface on a plane with the inlet of the extrusion holes so that the cereal will feed smoothly from screw 24 into the extrusion holes. Insert 64 is held in place in the recess by a screw 76 extending through a hole in the center of insert 62. Once the two inserts are assembled in place with pins 68 in the radial holes, the three die parts 60, 62 and 64 form an integrated, solid structure which is usually used over long periods of time without being disassembled.

Insert 62 contains a plurality of longitudinal slots 80 extending radially inwardly from the peripheral surface and when the insert is assembled in ring 60 the external part of the slots is closed by the internal surface of the ring to form the extrusion holes 82 of the die. The slots in the insert can be readily machined in the construction of the die and can be easily cleaned of material too difficult to remove from the extrusion holes while the parts of the die are fully assembled. Recess 75 permits easy access to the two sides of the inlet end of slots 80 both for machining and for cleaning operations.

The particular shape of the extrusion holes is of special importance in obtaining collets of a relatively flat elongated shape such as shown at numeral 83 in FIGURE 19 of the drawings. The inlet portion 84 of the extrusion holes is of a truncated wedge shape with the large end at the inner face of the die. The inner end of the inlet portion 84 is connected with a longitudinal portion 86 which extends the rest of the distance through the die and terminates at the outside surface where knife blade 28 cuts the extruded and puffed cereal product into sections of the desired length as it emerges from the extrusion holes.

The size of the extrusion holes is substantially smaller than the final product which immediately expands or puffs when it emerges from the holes. In order to produce a collet having the top and bottom surfaces, as viewed in FIGURE 19, alike, i.e. substantially flat or slightly convex in the transverse direction on both top and bottom instead of the top surface being slightly convex and the bottom concave, the side 88 of longitudinal portion 86 facing away from the direction of rotation of screw 24 is concave in the transverse direction. For example, if the screw is rotating in the clockwise direction, as viewed from the front of the machine, the lower side 88 of the hole in the position of three o'clock and the upper side 88 of the hole in the position of nine o'clock are concave in shape. Hereinafter in the specification and in the appended claims this side 88 of the longitudinal portion 86 of the extrusion holes will be referred to as the "forward side." The side 90 of the longitudinal portion opposite the forward side 88 is completely or substantially flat throughout its length and breadth, and narrow sides 92 and 94 are straight flat surfaces parallel with the axis of the screw and inserts.

Hopper 14 which is mounted above housing 10 on a fixture 100 is a cylindrical container having an open top and a sloping bottom which feeds the dry meal into chamber 18 where a small amount of water from supply pipe 102 is added and the resulting mixture is stirred thoroughly by a pair of rotating beaters mounted on stems 104 and 106 and driven by a motor 108 through shaft 110, reducing gears 112 and 114 and shaft 116, said latter shaft being journalled in and supported by bearings 118 and 120 mounted on the side of the hopper. The amount of moisture which is added to the meal in chamber 18 is controlled by a valve 122 in pipe 102, the amount of water being less than that required to form a paste. After the meal and water have been thoroughly stirred in chamber 18 the mixture is discharged into throat 22 of the housing and is carried from there by screw 24 to the head plate and extruded through holes 82. The rate at which the mixture is fed to the extruding mechanism is controlled by a sliding door or valve 124 at the bottom of chamber 18.

Knife 28 for cutting the extruded material into sections as it emerges from holes 82 consists of a blade 130 mounted on the end of a shaft 132 which is driven by a motor (not shown) through a gear reduction box 133, sprocket 134, chain 136 and sprocket 138 mounted on the end of shaft 132 opposite the knife blade, said gear reduction box being mounted on a supporting member 139 secured to the base. The cutting edge of the blade is adapted to shear the material from the plate by passing in close proximity thereto. Shaft 132 is journalled in bearings 141 which are supported by housing 10. The motor for driving the blade is mounted behind box 133 on an adjustable motor mount secured to member 142 and is provided with a conventional variable speed pulley so that the speed at which the blade revolves can be synchronized with the rate at which the material is being extruded from the head plate and can be varied relative to said rate to vary the length of the sections into which the extruded material is cut.

In the operation of the foregoing machine, corn meal or the like is added to hopper 14 from the top, and head plate 26 and adjacent portions of the insert, adapter and housing are heated with any suitable type of heating means such as a gas flame or an electrical heating element, until the temperature of these members has been raised to a point above that required to cause vaporization of the moisture in the corn meal mixture. The motor for driving the extruding mechanism, the motor for driving the beaters in chamber 18 and the motor for driving knife 28 are all placed in operation. The meal is then permitted to flow from hopper 14 into chamber 18 where it is mixed by the beaters with a small amount of water from supply pipe 102, and the resultant mixture is permitted to fall into throat 22 in the housing above screw 24. Rotation of the screw moves the mixture from the throat and propels it under substantial pressure into wedge shaped portions 84 of the head plate, causing it to flow through the extrusion holes. Since the temperature of the head plate is somewhat above the vaporization point of the moisture in the mixture, the moisture vaporizes causing the mixture mass to expand and become cellular throughout and light in texture. The temperature at which this vaporization takes place is sufficient to prebake the mixture as it passes through the head plate causing it to become firm and somewhat brittle. As the material emerges from the die, revolving knife 28 passes intermittently in front of the plate severing the extruded and puffed material into sections of the desired length. The speed at which the knife revolves in relation to the rate at which the material is extruded determines the length of the sections. These sections of material represent an intermediate stage in the production of collets, the further steps including a final baking operation, salting and coating with a cheese mix or any other desirable coating mix. The material produced by the machine disclosed herein may be packaged and shipped to other plants and customers where the additional processing steps are performed.

Once the machine is placed in operation no external heat need be applied to the head plate to maintain the temperature at the point required to vaporize the moisture in the corn meal mixture since the pressure created by screw 24 in forcing the mixture through the head plate creates sufficient heat to maintain the plate at the required temperature for satisfactory operation of the machine.

After the machine has been stopped and permitted to cool, the mix in the extrusion holes in the plate tends to adhere to the metal and must be punched and picked out of the holes after the plate has been removed from the machine. By the present arrangement, the material normally can be readily driven from the holes with a punch while inserts 62 and 64 are assembled in place in the die; however, if the adherence of the material in the holes should become severe and extremely difficult to remove, the inserts can be disassembled so that slots 80 are fully exposed along the periphery of insert 62, thus permitting ready access to the adhering material in the slots. When insert 64 has been removed from the recess in insert 62 the inner and outer sides of the wedge shaped portion 80 of the extrusion holes are fully exposed.

While in the foregoing description reference has been primarily made to the production of collets from corn meal, the machine can be used to produce similar products from other cereals.

Various changes and modifications can be made in the machine and parts of the machine disclosed herein without departing from the scope of the invention.

I claim:

1. An extrusion die in combination with a cereal processing machine having a body with a cylindrical chamber therein on the end of which the die is mounted and a rotatable screw for propelling cereal to said die, said die including a ring shaped member secured to the end of said body and having a central opening of substantially the same size as said cylindrical chamber and in axial alignment with said chamber, an annular extension on said ring on the side opposite the screw, a cylindrically shaped insert fitting snugly into the opening of said ring shaped member and having a plurality of equally spaced slots extending inwardly from the periphery of the insert and throughout the length thereof, each of said slots having a truncated wedge shaped inlet portion with the large end thereof facing the screw and communicating with said chamber and a longitudinal portion connected with the small end of said truncated wedge shaped portion and terminating at the surface opposite said screw, the forward side of said longitudinal portion being concave in the transverse direction, a cylindrical recess in the end of said insert adjacent the screw and communicating with the inner sides of said wedge shaped portion, a cylindrical insert seated in said recess, a means extending longitudinally through said first mentioned insert for securing said second mentioned insert in said recess, and a plurality of radially disposed pins extending through said extension and into said first mentioned insert for securing said ring shaped member and said first mentioned insert together.

2. An extrusion die in combination with a cereal processing machine having a body with a cylindrical chamber therein on the end of which the die is mounted and a rotatable screw for propelling cereal to said die, said die including a ring shaped member secured to the end of said body and having an opening of substantially the same size as said cylindrical chamber and in axial alignment with said cylindrical chamber, a cylindrically shaped insert fitting snugly into the opening of said ring shaped member and having a plurality of slots extending inwardly from the periphery of the insert and throughout the length thereof, each of said slots having a truncated wedge shaped inlet portion with the large end thereof facing the screw and communicating with said chamber and a longitudinal portion connected with the small end of said truncated wedge shaped portion and terminating at the surface opposite said screw, the forward side of said longitudinal portion being concave in the transverse direction and the rearward side of said longitudinal portion being straight in the transverse direction, means securing said insert in and to said ring, a cylindrical recess in the end of said insert adjacent the screw and communicating with the inner sides of said wedge shaped portion, and an insert removably seated in said recess.

3. An extrusion die in combination with a cereal processing machine having a body with a cylindrical chamber therein on the end of which the die is mounted and a rotatable screw for propelling cereal to said die, said die including a ring shaped member secured to the end of said body and having an opening in axial alignment with said cylindrical chamber, a cylindrically shaped insert fitting snugly into the opening of said ring shaped member and having a plurality of slots extending inwardly from the periphery of the insert and throughout the length thereof, each of said slots having a truncated wedge shaped inlet portion with the large end thereof facing the screw and communicating with said chamber and a longitudinal portion connected with the small end of said truncated wedge shaped portion and terminating at the surface opposite said screw, the forward side of said longitudinal portion being concave in the transverse direction, and means for removably securing said ring shaped member and insert together.

4. In a cereal processing machine having a body with a cylindrical chamber therein and a means for propelling cereal to said die, an extrusion die including a ring shaped member secured to the end of said body and having an opening of substantially the same size as said cylindrical chamber and in axial alignment with said cylindrical chamber, a cylindrically shaped insert fitting snugly into the opening of said ring shaped member and having a plurality of slots extending inwardly from the periphery of the insert and throughout the length thereof, a cylindrical recess in the end of said insert adjacent the propelling means and communicating with the inner sides of said slots, an insert removably seated in said recess, and a plurality of radially disposed pins extending through said ring and into said first mentioned insert for securing said ring shaped member and first mentioned insert together.

5. An extrusion die for a cereal processing machine comprising a ring shaped member having an opening, a cylindrically shaped insert fitting snugly into the opening of said ring shaped member and having a plurality of slots extending inwardly from the periphery of the insert and throughout the length thereof, and means for securing said ring shaped member and insert together.

6. An extrusion die for a cereal processing machine comprising a ring shaped member having a central opening, and a cylindrically shaped insert fitting snugly into the opening of said ring shaped member and having a plurality of slots extending inwardly from the periphery of the insert and throughout the length thereof, each of said slots having an inwardly tapered inlet portion and a longitudinal portion connected with said tapered portion and terminating at the outlet of the slot, and means securing said insert in and to said ring.

7. In a cereal processing machine having a body with a cylindrical chamber therein and a rotatable screw for propelling cereal to said die, an extrusion die including a ring shaped member secured to the end of said body and having an opening in axial alignment with said cylindrical chamber, and a cylindrically shaped insert fitting snugly into the opening of said ring shaped member and having a plurality of longitudinally arranged slots extending inwardly from the periphery of the insert and throughout the length thereof, each of said slots having a truncated wedge shaped inlet portion with the large end thereof facing the screw propelling means and communicating with said chamber, and a longitudinal portion connected with the small end of said truncated wedge shaped portion and terminating at the surface opposite said screw, the forward side of said longitudinal portion being concave in the transverse direction, and means securing said insert in and to said ring.

8. In a cereal processing machine having a body with a cylindrical chamber therein and a rotatable screw for propelling cereal to said die, an extrusion die including a disc shaped body member having a larger diameter than said chamber and a plurality of extrusion holes extending therethrough and inwardly from the periphery thereof and disposed in a circle concentric with and substantially the same diameter as said chamber, each of said holes being widest in the radial direction of said disc-shaped body member and having a truncated wedge shaped inlet portion with the large end thereof facing the screw and a longitudinal portion connected with the small end of said truncated wedge shaped portion and terminating at the surface opposite said screw, the forward side of said longitudinal portion being concave in the transverse direction and the rearward side of said longitudinal portion being straight in the transverse direction.

9. In a cereal processing machine having a body with a generally cylindrical chamber therein and a rotatable screw for propelling cereal to said die, an extrusion die including a disc shaped body member having a plurality of extrusion holes therethrough and extending inwardly from the periphery thereof, each of said holes being widest in the radial direction of said disc-shaped body member and having an inwardly tapered inlet portion communicating with said chamber and a longitudinal portion connected with said tapered portion and terminating at the surface opposite said screw, said longitudinal portion being generally rectangular in its transverse direction, the forward side of said longitudinal portion being concave in the transverse direction and the rearward side of said longitudinal portion being straight in the transverse direction.

References Cited in the file of this patent

UNITED STATES PATENTS

| | | |
|---|---|---|
| 1,402,672 | Sizer | Jan. 3, 1922 |
| 1,487,378 | Gigliotti | Mar. 18, 1924 |
| 2,005,689 | Hall | June 18, 1935 |
| 2,060,408 | Wood | Nov. 10, 1936 |
| 2,488,595 | Henning | Nov. 22, 1949 |
| 2,638,855 | Maldari | May 19, 1953 |
| 2,705,927 | Graves et al. | Apr. 12, 1955 |
| 2,842,072 | Graves | July 8, 1958 |
| 2,853,027 | Graves | Sept. 23, 1958 |

FOREIGN PATENTS

| | | |
|---|---|---|
| 318,472 | France | June 27, 1902 |
| 939,989 | France | May 10, 1948 |